(12) United States Patent
Buchholz

(10) Patent No.: US 6,632,131 B1
(45) Date of Patent: Oct. 14, 2003

(54) COMBINATION ROTARY CUTTING AND SANDING BLADE

(76) Inventor: Terry L. Buchholz, P.O. Box 368, Glenwood, IA (US) 51534

( * ) Notice: Subject to any disclaimer, the term of this patent is extended or adjusted under 35 U.S.C. 154(b) by 0 days.

(21) Appl. No.: 09/497,944

(22) Filed: Feb. 3, 2000

(51) Int. Cl.7 ................................................ B23F 21/03
(52) U.S. Cl. ........................ 451/547; 451/541; 451/550; 451/70; 125/13.01; 125/15
(58) Field of Search .................. 451/541, 547, 451/548, 69, 550, 70; 125/13.01, 15, 22

(56) References Cited

U.S. PATENT DOCUMENTS

| 118,800 A | 9/1871 | Green |
|---|---|---|
| 484,639 A | 10/1892 | Larish |
| 1,269,653 A | 6/1918 | Smith |
| 1,954,560 A | 4/1934 | Cunningham |
| 2,032,395 A | 3/1936 | Bley |
| 2,524,323 A | 10/1950 | Lloyd-Young |
| 3,451,721 A | 6/1969 | Highberg et al. |
| 3,491,742 A | 1/1970 | Weiss |
| 4,407,263 A | 10/1983 | Murata |
| 4,675,975 A | 6/1987 | Kucharczyk et al. |
| 4,962,748 A | 10/1990 | Schweickhardt |
| 5,115,796 A | 5/1992 | Schweickhardt |
| 5,697,835 A | 12/1997 | Nitz et al. |

FOREIGN PATENT DOCUMENTS

| RU | 821136 | 4/1981 |
|---|---|---|
| RU | 1722822 | 3/1992 |

Primary Examiner—Eileen P Morgan
(74) Attorney, Agent, or Firm—Adam H. Jacobs

(57) ABSTRACT

Rotary saw blades (1, 17, 18) for use on a power saw are disclosed for cutting and sanding materials simultaneously. The rotary blades have abrasive sanding means (10, 11) affixed to each face of the blade to accomplish the sanding process. The abrasive means may take the form of donut-shaped abrasive pieces (10) affixed radially inward of blade cutting teeth (3) on each face of the blade or a plurality of abrasive pieces or disks (11) attached to various locations on both faces of the blade. The plurality of abrasive pieces may consist of different grades of sand paper with the heavier grades of paper being radially nearest the teeth and finer grades inward so that the material when cut may be gradually sanded and polished as the cutting occurs. One embodiment provides rotary blades (17, 18) with recessed areas (12, 15) for fixing thicker pieces of adhesive means or for use when the kerf width (9) of the blade teeth (3) is less. The adhesive sanding means may be removably affixed by adhesive to enable replacement when worn or as desired. Cuts made by this invention are virtually invisible making it especially useful for molding, trim or miter joints.

21 Claims, 1 Drawing Sheet

COMBINATION ROTARY CUTTING AND SANDING BLADE

BACKGROUND OF THE INVENTION

This invention relates to cutting tools and more particularly a rotary blade that cuts and sands materials at the same time.

Conventional rotary saw blades used to cut wood and other materials actually tear or rip through the materials leaving small splinters attached to the edge of the cut. Accordingly, a worker has to perform additional work to remove such splinters by sanding or filing the edges of the cut. Notwithstanding such sanding or filing, when two pieces of the cut material are abutted, such as in molding, trim and miter joints, the unsightly cut lines can be easily seen, even after the joint is stained or painted.

Thus, there exists a need for a cutting tool that will create a smooth cut and also reduce the labor associated with trying to smooth the cut.

Some prior inventions have attempted to fulfill the above need, but none is like the present invention. The most pertinent prior art includes the following U.S. Patents:

| U.S. Pat. No. (U. S. unless stated otherwise) | Inventor | Issue Date |
| --- | --- | --- |
| 2,524,323 | Lloyd-Young | Oct. 3, 1950 |
| 1,269,653 | Smith | June 18, 1918 |
| 1,139,817 | Smith | May 18, 1915 |
| 4,962,748 | Schweickhardt | Oct. 16, 1990 |
| 5,115,796 | Schweickhardt | May 26, 1992 |
| 3,451,721 | Highberg, et al. | June 24, 1969 |
| 484,639 | Larish | Oct. 18, 1892 |
| 4,675,975 | Kucharczyk, et al. | June 30, 1987 |
| 5,697,835 | Nitz, et al. | Dec. 16, 1997 |
| 118,800 | Green | Sept. 12, 1871 |
| SU 1,722,822 | | March 30, 1992 |
| 4,407,263 | Murata | Oct. 4, 1983 |
| SU 821,136 | | April 15, 1981 |
| 3,491,742 | Weiss | Jan. 27, 1970 |
| 2,032,395 | Bley | March 3, 1936 |
| 1,954,560 | Cunningham | April 10, 1934 |

The Lloyd-Young teaches a circular saw blade with sand paper removably attached to one side by rivets through slots in the blade. The two Smith patents teach circular saw blades with sandpaper fixed to both sides but the sand paper is not removable. Also, either Smith patent does not teach the use of pieces of abrasive material extending wavily from the center of the blade as does one embodiment of the present invention. The use of pieces of abrasive material reduces drag on the blade requiring less horse power to rotate the blade and eliminates a wood burn due to heating on the blade on the surfaces covered by abrasive material. The two Schweickhardt patents cover an apparatus and method involving a saw blade with diamond abrasive on the sides for dry cutting masonry and concrete. The Highberg, et al. patent discloses a cylindrical milling tool that has abrasive inserts on it. The Larish patent teaches a combination joint and sanding machine that has circular cutting blades with a sanding surface on one side of the blade. The Kucharczyk teaches a drill press which has cutter inserts for planing and an abrasive disk for finishing. The Nitz, et al. patent discloses oscillating cutting blades with grips on the edges for smoothing cuts. The Green patent teaches a jigsaw blade with rasp sides to smooth cuts for painting. Russian Patent No. 1,722,822 shows a disc saw with ring bands of abrasive material, an arrangement which would not provide a uniform smooth cut. The Murata patent discloses a cutting blade with abrasive material in recesses, but it is not a rotary blade as is the present invention. The Weiss shows a cutting blade with abrasive particles bonded only to the inner cutting edge. The Bley patent also shows a blade with abrasive material on the cutting edge. Finally, Cunningham shows a grinding wheel with abrasive material on the grounding surfaces thereof.

Unlike the present invention, none of the prior art discloses cutting and sanding blades having the same structure as the present invention or blades that have a plurality of removable abrasive pads which may be replaced when worn or as desired without having to remove the rotary blade from a power saw.

SUMMARY OF THE INVENTION

The major objects of the present invention are to provide a cutting tool which:

Makes a smooth cut in wood, plastic, metal or other material;

Reduces the time and costs of labor assisted with cutting materials;

Performs the cutting and sanding job without additional power requirements;

Allows the abrasive sanding surface to be changed when worn or as desired; and

Allows a multiplicity of different abrasive surfaces to be used so that the cut is gradually sanded and polished.

The present invention accomplishes the above and other objects by affixing abrasive sanding means to a conventional rotary saw blade positionally so it does not cover the cutting teeth and is outward of the central access hole of the cutting blade. The abrasive sanding means extends beyond each face of the blade a sufficient amount so as to shear off slivers of material that normally remain after cutting, which have to be sanded and polished along the cut line made in the materials. The abrasive sanding means may consist of two sheets of material, one each on each face of the blade or may consist of a plurality of abrasive sanding pieces that are distributed around the blades so the full sanding coverage is made during the cut. The abrasive sanding means may be adhesively attached to the blades so that they can be removed and replaced when worn or as desired. Although the combined width of the abrasive sanding means and rotary saw is designed to be approximately equal to the kerf of the blade so as not to require additional electrical horsepower requirements for the power saw, a saw blade with recessed areas is also provided so that thick abrasive surfaces may be utilized and not extend beyond the kerf of a blade.

The above and other objects, features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE PREFERRED EMBODIMENTS

Figure 1:
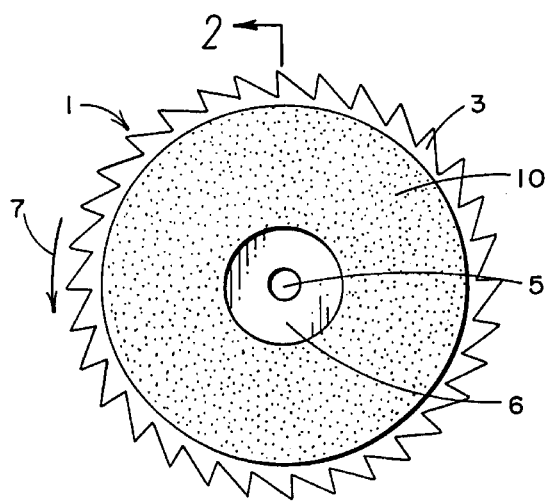
FIG. 1 is a side elevational view of a rotary saw blade with a sanding surface affixed thereto.
Figure 2:
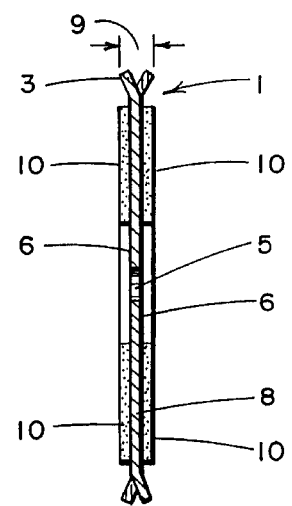
FIG. 2 is a sectional view along line 2—2 of FIG. 1.
Figure 3:
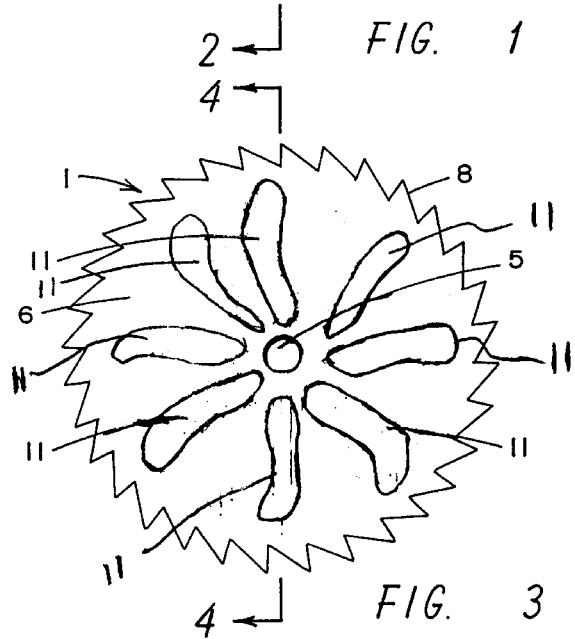
FIG. 3 is side elevations view of another rotary circular saw blade with a plurality of pieces of abrasive sanding material affixed thereto.
Figure 4:
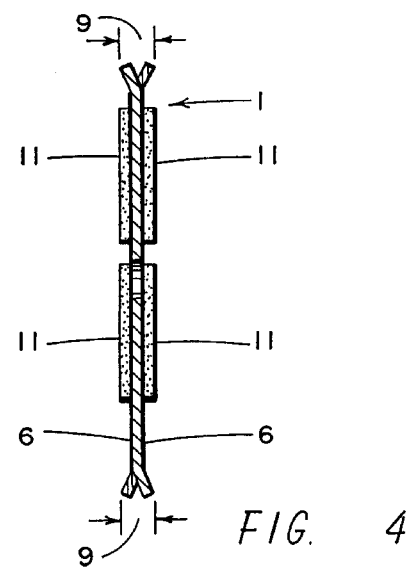
FIG. 4 is a sectional view along line 4—4 in FIG. 3.

For purposes of describing the preferred embodiment, the terminology used in reference to the numbered components in the drawings is as follows:

1. rotary circular cutting and sanding blade
3. saw cutting teeth
5. blade rotational center hole
6. face of saw blade
7. direction of blade rotation
8. curved portion of saw blade
9. blade kerf
10. sanding/adhesive surface
11. abrasive pieces
12. recessed portions of blade
13. abrasive material in recessed area
14. standard unrecessed portion of blade
15. recessed portions of blade for retaining abrasive appliques
16. unrecessed portions of blade
17. rotary blade with recessed area on each side of blade
18. rotary blade with plurality of recessed areas on each side of blade
19. faces of recessed blade Referring now to the drawings, in FIG. 1 a rotary circular cutting and sanding blade denoted generally as 1 is illustrated. This blade 1 contains the standard features of a conventional blade, such as the teeth 3, which are normally slightly bent to from the width of the cutting teeth, called kerf 9. Additionally, the blade 1 contains a central rotational center hole 5 where it is attached to a power saw. The blade is designed to rotate in the direction indicated by arrow 7 in accordance with the angle of the teeth 3 for cutting. In this embodiment of the invention a circular abrasive sanding material 10 is affixed to the blade 1 so that it is radially inward of the teeth 3 and radially outward of the central hole 5 so that it leaves the teeth and inner portion 6 of the blade clear. When the blade 1 is rotated the teeth 3 first cut the material and thereafter the abrasive surfaces 10 on each face of the saw blade 6 sand the surfaces of the material along the cut, thereby removing any slivers of the material and smoothing the surfaces of the cut. FIGS. 3 and 4 illustrate the saw blade 1 having a plurality of abrasive sanding surfaces 11 disbursed on each face 6 of the blade. These abrasive sanding surfaces may take the shape of a disk or other shape and may be distributed along each face of the blade 6 such that 100% coverage is achieved during the sanding process. The use of a plurality of abrasive surfaces 11 enables one to use different grades of abrasive sanding paper to achieve a desired result. For instance, the pieces of abrasive material radially nearest the teeth might have rougher grades with the finer grades radially near the central hold 5. In this manner the cut would be gradually sanded and polished during the cutting process.

Figure 5:
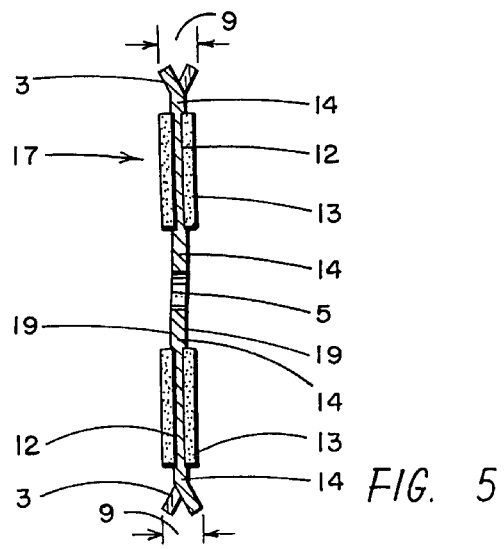
FIG. 5 is a sectional view along line 2—2 of FIG. 1 wherein the blade is recessed in the area where the sanding surface is affixed;.
Figure 6:
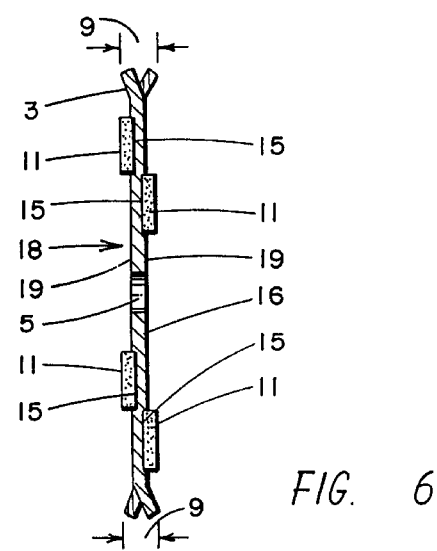
FIG. 6 is a end cross-sectional view of a rotary saw blade wherein the blade is recessed in various places on both sides of the blade to retain pieces of abrasive sanding material.

FIGS. 5 and 6 illustrate the rotary saw blades 17 and 18, respectively, which contain recessed areas 15 and 16 on each face of the blade 19 so that the abrasive surfaces 13 in FIG. 5 and 11 in FIG. 6 can be affixed. Having recessed areas allows thicker abrasive material to be used without exceeding the kerf 9 of the blade or increasing electrical power requirements for the power saw.

In FIG. 5 the rotary blade 17 is substantially the same as blade 1 shown in FIG. 1 with two disks of adhesive material 13 attached to each face of the blade 17, with the exception that it has a circular recessed area 12 on each face of the blade. Likewise, the blade 18 of FIG. 6 is primarily the same as FIG. 4 except that it has recessed areas 15 wherein a plurality of adhesive pieces can be affixed.

Notwithstanding whether the blade is a conventional blade as shown in FIGS. 1–4 or a recessed blade as show in FIGS. 5 and 6, the abrasive sanding surfaces may be removably attached by using an adhesive so that the abrasive surfaces can be removed when they become worn and replaced with fresh abrasive pieces. Also, removably affixed abrasive surfaces would allow one to change the abrasive surfaces as desired. For instance, when a different grade of abrasive material is necessary due to the nature of the material being cut, such as softwood, hardwood, plastics or various metals of different hardness and thickness.

Not only can this combination cutting and sanding blade be utilized for cutting and removing splinters and polishing the cut, but the blade can also be used as a disk sander by pushing the material to be sanded against the abrasive materials on the face of the blade when rotating on a power saw.

Although only a few embodiments of the present invention have been described in detail hereinabove, all improvements and modifications to this invention within the scope or equivalents of the claims are covered by this invention.

Having thus described my invention, I claim:

1. A rotary cutting and sanding blade for use in a power saw, said blade having a central rotational hole, two faces and a peripheral edge that has notches therein defining cutting teeth, said blade further comprising:

abrasive sanding means affixed to both faces of the blade radially inward of the cutting teeth and radially outward of the central rotational hole, said abrasive sanding means including two sheets of abrasive material, one of each adhesively attached to opposite side faces of the blade so that said means can be removed and replaced when worn or as desired and each of said abrasive sanding means extending beyond each face of the blade a sufficient amount to shear off slivers of material that normally remain after cutting, and to sand and polish along surfaces of a cut being made in a material; and said blade being recessed on each face in areas where said abrasive sanding means is affixed such that said abrasive sanding means projects from the face of the blade a distance not to exceed a kerf of the blade.

2. The rotary cutting and sanding blade of claim 1 wherein the abrasive sanding means comprises two sheets of abrasive material, one of each adhesively attached to opposite side faces of the blade so that said means can be removed and replaced when worn or as desired.

3. The rotary cutting and sanding blade of claim 1 wherein the abrasive sanding means comprises a plurality of abrasive sanding pieces on each face of the blade.

4. The rotary cutting and sanding blade of claim 3 wherein the plurality of abrasive sanding pieces is adhesively attached to opposite side faces of the blade so that said means can be removed and replaced when worn or as desired.

5. The rotary cutting and sanding blade of claim 1 wherein the blade is recessed on each face in areas where the abrasive sanding means is affixed such that the sanding means projects from the face of the blade a distance not to exceed a kerf of the blade.

6. The rotary cutting and sanding blade of claim 2 wherein the blade is recessed on each face in areas where the abrasive sanding means is affixed such that the sanding means projects from the face of the blade a distance not to exceed a kerf of the blade.

7. The rotary cutting and sanding blade of claim 3 wherein the blade is recessed on each face in areas where the abrasive sanding means is affixed such that the sanding means projects from the face of the blade a distance not to exceed a kerf of the blade.

8. The rotary cutting and sanding blade of claim 4 wherein the blade is recessed on each face in areas where the abrasive sanding means is affixed such that the sanding means projects from the face of the blade a distance not to exceed a kerf of the blade.

9. The rotary cutting and sanding blade of claim 3 wherein the plurality of abrasive sanding pieces is positioned on each face of the blade such that sanding occurs along the entire face of the blade excluding the teeth of the blade.

10. The rotary cutting and sanding blade of claim 4 wherein the plurality of abrasive sanding pieces is positioned on each face of the blade such that sanding occurs along the entire face of the blade excluding the teeth of the blade.

11. The rotary cutting and sanding blade of claim 5 wherein the plurality of abrasive sanding pieces is positioned on each face of the blade such that sanding occurs along the entire face of the blade excluding the teeth of the blade.

12. The rotary cutting and sanding blade of claim 3 wherein the plurality of abrasive sanding pieces comprises different grades of abrasive sanding materials.

13. The rotary cutting and sanding blade of claim 4 wherein the plurality abrasive sanding pieces comprises different grades of abrasive sanding materials.

14. The rotary cutting and sanding blade of claim 5 wherein the plurality of abrasive sanding pieces comprises different grades of abrasive sanding materials.

15. The rotary cutting and sanding blade of claim 3 wherein the plurality of abrasive sanding pieces on each face of the blade are curvilinear and arranged in a radial fashion on the blade.

16. The rotary cutting and sanding blade of claim 15 wherein the plurality of abrasive sanding pieces is adhesively attached to opposite side faces of the blade that said means can be removed and replaced when worn or as desired.

17. The rotary cutting and sanding blade of claim 15 wherein the blade is recessed on each face in areas where the abrasive sanding means is affixed such that the sanding means projects from the face of the blade a distance not to exceed a kerf of the blade.

18. The rotary cutting and sanding blade of claim 15 wherein the plurality of abrasive sanding pieces is positioned on each face of the blade such that sanding occurs along the entire face of the blade excluding the teeth of the blade.

19. The rotary cutting and sanding blade of claim 15 wherein the plurality of abrasive sanding pieces comprises different grades of abrasive sanding materials.

20. A rotary cutting and sanding blade for use in a power saw, said blade having a central rotational hole, two faces and a peripheral edge that has notches therein defining cutting teeth, said blade further comprising:

abrasive sanding means affixed to both faces of the blade radially inward of the cutting teeth and radially outward of the central rotational hole, said abrasive sanding means including a plurality of abrasive sanding pieces on each face of the blade; and said blade being recessed on each face in areas where said abrasive sanding means is affixed such that said abrasive sanding means projects from the face of the blade a distance not to exceed a kerf of the blade.

21. A rotary cutting and sanding blade for use in a power saw, said blade having a central rotational hole, two faces and a peripheral edge that has notches therein defining cutting teeth, said blade further comprising:

abrasive sanding means affixed to both faces of the blade radially inward of the cutting teeth and radially outward of the central rotational hole, said abrasive sanding means including a plurality of abrasive sanding pieces on each face of the blade, each of said abrasive sanding pieces being adhesively attached to opposite side faces of the blade such that said abrasive sanding pieces are removable and replaceable when worn or as desired; and said blade being recessed on each face in areas where said abrasive sanding means is affixed such that said abrasive sanding means projects from the face of the blade a distance not to exceed a kerf of the blade.

* * * * *